United States Patent [19]
Ray-Chaudhuri et al.

[11] 3,891,584
[45] June 24, 1975

[54] WATER-DISPERSIBLE HOT MELT ADHESIVES AND PRODUCTS USING SAME

[75] Inventors: Dilip K. Ray-Chaudhuri, Somerville; Jules E. Schoenberg, Scotch Plains; Thomas P. Flanagan, Green Brook, all of N.J.

[73] Assignee: National Starch and Chemical Corporation, Bridgewater, N.J.

[22] Filed: Feb. 22, 1974

[21] Appl. No.: 444,780

[52] U.S. Cl. ............... 260/27 R; 260/876; 260/878
[51] Int. Cl. .......................... C08d 9/12; C09j 3/26
[58] Field of Search .......... 260/27 R, 878, 876, 89.1

[56] References Cited
UNITED STATES PATENTS

| | | | |
|---|---|---|---|
| 3,033,841 | 5/1962 | Germain | 260/89.1 |
| 3,502,744 | 3/1970 | Weitzel | 260/876 |
| 3,580,975 | 5/1971 | Rademacher | 260/878 |

OTHER PUBLICATIONS

Skeist "Handbook of Adhesives" 1962, p. 194 relied on.

*Primary Examiner*—Melvyn I. Marquis
*Assistant Examiner*—William E. Parker

[57] ABSTRACT

A water-dispersible hot melt adhesive comprises 75–95 parts of a graft copolymer of about 40–80% vinyl monomer and about 20–60% by weight of water-soluble polyalkylene oxide polymer, and 5–25 parts by weight tackifying resin. The water-soluble polyalkylene oxide polymer has a molecular weight of about 3000 to 20,000 and a polymerized ethylene oxide content of at least 50% by weight. The vinyl monomer is preferably a vinyl acetate or low molecular weight alkyl-substituted acrylate. The adhesive is preferably 75–85% copolymer and 15–25% by weight tackifying resin.

17 Claims, No Drawings

WATER-DISPERSIBLE HOT MELT ADHESIVES AND PRODUCTS USING SAME

BACKGROUND OF THE INVENTION

As part of the world-wide efforts directed towards both pollution control and conservation of natural resources, every economically feasible avenue for the production of recyclable paper products is currently being ivestigated. While a great measure of success has been obtained in the area of recycling products composed of paper alone, progress has been impeded in the area of recycling products which are composed primarily of paper, but also contain small amounts of adhesive—for example, books in which the pages are bound with adhesive.

The recycling of paper products involves heating and stirring the paper products in water to cause the paper to disintegrate into its component fibers. When a non-water-dispersible adhesive is present, the paper fibers will break away from the adhesive leaving within the disintegrated fiber mass large lumps and films of adhesive which eventually show up in the reformed (recycled) paper as blotches and irregularities. As a result, the reformed paper is considered of lower quality than non-recycled paper not only because of its non-uniform appearance, but also because of its non-uniform properties including variations in the ability of its surface to retain ink due to the presence of adhesive lumps and films thereon.

Accordingly, it is an object of the present invention to provide a water-dispersible and water-moistenable hot melt adhesive useful in the formulation of a totally recyclable adhesive-coated product.

It is also an object to provide an adhesive-coated paper wherein the adhesives disintegrate in warm water into fine particles or emulsions which are retained by the paper fibers, but do not mar the surface of the reformed paper sheet.

It is a further object to provide an article having portions of paper bonded together by such an adhesive.

SUMMARY OF THE INVENTION

It has now been discovered that the above and related objects of the present invention are obtained in a water-dispersible hot melt adhesive film comprising 75–95 parts graft copolymer and 5–25 parts by weight tackifying resin, preferably 75–85 parts copolymer and 15–25 parts resin. The graft copolymer is formed of about 40–80% vinyl monomer and about 20–60% by weight water-soluble polyalkylene oxide polymer having a molecular weight of about 3,000 to 20,000 and a polymerized ethylene oxide content of at least 50% by weight.

It is to be understood that the graft polymers herein are mixtures of graft and homopolymers of the respective monomers. For convenience these graft polymer mixtures will be termed "graft polymers" throughout the specification and claims.

The vinyl monomer is preferably selected from the group consisting of vinyl acetate, alkyl-substituted acrylates such as methyl acrylate and ethyl acrylate, and mixtures thereof. The polyalkylene oxide polymer is preferably selected from the group consisting of homopolymers of ethylene oxide, random copolymers of ethylene and propylene oxides, and mixtures thereof. Preferably, the graft copolymer contains about 25–45% by weight of the polyalkylene oxide polymer, and the polyalkylene oxide polymer in turn has a polymerized ethylene oxide content of at least 75% by weight. Various plasticizers, antioxidants, ethylenically unsaturated monomers and other additives may optionally be incorporated in the adhesives.

The adhesives of the present invention are characterized by their ability to disperse in water so that papers coated with such adhesives are recyclable without adverse effects. The adhesives are both thermally and oxidatively stable (important properties for hot melt adhesives) and compatible with many different plasticizers or diluents; furthermore they have the ability to disintegrate and become emulsified or finely dispersed when stirred in warm water. By way of contrast, it is noted that pure poly (vinyl acetate) is insoluble in water, and adhesives derived therefrom are non-dispersible in water. While certain copolymers of vinyl acetate with polar monomers (for example, N-vinyl pyrrolidone, acrylic acid, 2-hydroxy ethyl acrylate) are water-dispersible, such copolymers make inferior hot-melt adhesives. The water-dispersible nature of the graft copolymer of the present invention is even more surprising when it is recognized that physical blends of 50–80% by weight polyvinyl acetate and 20–50% polyethylene oxide have already been used for adhesives, but found not to be water-dispersible.

The water-dispersible hot melt applied adhesives of the present invention are primarily useful in the preparation of fully recyclable paper and paper products, such as books, although it will be recognized that the adhesives may be applied to substrates of other compositions as well.

Details of the preparation of related graft copolymers are described in Makro Chem, 58, 75–103 (1962) and U.S. 3,033,841 (1962), although the related graft copolymers products are either not useful, or not recognized as useful, in the formulation of water-dispersible hot melt adhesives.

DETAILED DESCRIPTION OF THE PREFERRED EMBODIMENTS

The water-dispersible hot melt adhesive compositions of the present invention comprise a graft copolymer of vinyl monomer and a water-soluble polyalkylene oxide polymer, and one or more tackifying resins.

The water-soluble polyalkylene oxide polymers useful in the present invention have a molecular weight of about 3,000 to 20,000 and a polymerized ethylene oxide content of at least 50% by weight. The polyalkylene oxide polymers may be homopolymers of ethylene oxide (including the ester and ether derivatives thereof), random copolymers of ethylene and propylene oxide, block copolymers of ethylene and propylene oxides, or mixtures thereof. It will be noted that mixtures of different polyalkylene oxide polymers may be utilized, and copolymers and homopolymers may be used together in such mixtures. The polymers are commercially available from companies such as Union Carbide (the polyethylene oxide polymers, poly (ethylene oxide/propylene oxide) copolymers and monomethyl ethers of polyethylene oxide), Jefferson (the polyethylene oxide polymers), BASF Wyandotte (the block copolymers) and Dow Chemical Company (the homopolymers and random copolymers). More specifically, the Union Carbide products sold under the trade names CARBOWAX (for polyethylene oxides) and METHOXY CARBOWAX (for the monomethyl ethers of polyethylene oxide) have an average molecular weight roughly indicated by the numeral following the trade name —e.g. CARBOWAX 600 represents a poly (ethylene oxide) with an average molecular weight of about 600.

The polymerized ethylene oxide content of the polyalkylene oxide polymer should be at least 50% by weight of the polymer and preferably at least 75%. Polymers having a lower content of polymerized ethylene oxide groups display only limited solubility in water, and hence are not useful as the water-soluble polymer component of the present invention.

The polyalkylene oxide polymers having a molecular weight of less than about 3,000, when used as the sole polyalkylene oxide, have been found not to impart water dispersibility to the graft copolymers, and hence, such lower molecular weight polyalkylene oxide fractions should not be included in determining the proportion of the water-soluble component present in the graft copolymer. On the other hand, such low molecular weight polyalkylene oxides (e.g., CARBOWAX 600) are useful plasticizers or diluents.

The vinyl monomers useful in the practice of the present invention are preferably vinyl acetate and the lower alkyl-substituted acrylates such as methyl acrylate and ethyl acrylate. Other vinyl monomers useful in the present invention include the alkyl esters of acrylic acid containing 1 to 8 carbon atoms in the alkyl portion; styrene; and vinyl esters such as vinyl propionate, vinyl butyrate and the like. Use of the vinyl monomers, and in particular the vinyl acetate monomer, provides sufficient chain transfer in grafting to produce a graft copolymer which is thermally stable, moderately polar and readily formulatable into an adhesive composition of the present invention.

The graft copolymer is generally formulated from about 40 to 80% of the vinyl monomer and about 20-60% by weight of the water-soluble polyalkylene oxide polymer, and preferably about 25 to 45% water-soluble polyalkylene oxide polymer. Lower proportions of the polymer result in an adhesive composition with inferior water-dispersibility while higher proportions result in a composition with inferior adhesion characteristics.

While various vinyl monomers may be utilized by themselves for grafting onto the water-soluble polymer backbone, small amount of other ethylenically unsaturated monomers may be utilized as comonomers with the vinyl monomer to improve particular properties such as water-dispersibility, adhesion, softness and the like. Monomers useful as comonomers with the vinyl monomers include 2-hydroxyethyl acrylate, N-vinyl pyrrolidone, sodium vinyl sulfonate (the sodium salt of ethylene sulfonic acid) and the alkyl esters of methacrylic acid containing 1-8 carbon atoms in the alkyl portion. Such comonomers are generally utilized in quantities not exceeding 20% by weight of the total graft copolymer, and preferably not exceeding 10%.

In addition to the water-soluble polyalkylene oxide polymer, vinyl monomer and optional ethylenically unsaturated monomers, the adhesive must be formulated with one or more tackifying resins in order to produce a hot melt applicable adhesive composition. Such resins primarily produce a reinforcing effect or plasticizing (flexibility) effect, but also contribute stickiness, particular wetting ability, and viscosity control to the graft copolymer. Exemplary of such tackifying resins are rosin (from gum, wood or tall oil) and the rosin derivatives, the phenolic modified coumarone indene resins (sold by Neville Chemical Company of Neville Island, Pa. under the trade name of NEVILLAC), the coumarone indene resins with softening points of about 5°–117°C (sold by the aforementioned Neville Chemical Company under the trade name CUMAR, the phenolic modified terpene resins (sold by Reichhold Chemicals, Inc. of Elizabeth, N.J. under the trade name of NIREZ 2040 with a softening point of about 118°C and by Hercules, Incorporated of Wilmington, Del. under the trade name of PS 877 with a softening point of about 124°C), and a hard, brittle, high melting southern pine wood derivative (sold by the aforementioned Hercules, Incorporated under the trade name VINSOL with a softening point of about 222°F). (The softening points of the resins referred to above are Ball and Ring softening points determined using method ASTM E28-58T.)

The hot melt adhesive compositions of the present invention generally comprise 75-95 parts graft copolymer and 5-25 parts tackifying resin, and preferably 75-85 parts graft copolymer and 15-25 parts tackifying resin.

Wax-like functional diluents may optionally be incorporated into the adhesive composition to reduce the melt viscosity or alter the cohesive or dryness characteristics thereof without appreciably decreasing its adhesive binding characteristics. Exemplary of such wax-like functional diluents are the fatty alcohols (sold by Ashland Chemical Company, a division of Ashland Oil and Refining Company of Columbus, Ohio under the trade name of ALDOL 64), the mono-, di-, and triglycerides such as glycerol monostearate (sold by the aforementioned Ashland Chemical Company under the trade name STARFOL GMS 600) and hydrogenated castor oil (sold by Baker Castor Oil Company of Bayonne, N.J. under the trade name CASTORWAX), the polyoxyethylene fatty esters and ethers (sold by I.C.I. America of Wilmington, Del. under the trade names MYRJ and BRIJ), and the sorbitol fatty acid esters (sold by the aforementioned ICI America under the trade names ARLACEL and SPAN). As earlier mentioned the polyalkylene oxide polymers having an average molecular weight below about 3,000 may also be used as a diluent. Generally the optional wax-like diluents are used in amounts up to 25 parts per 100 parts of the adhesive About 5–20 parts of an appropriate diluent may be used to lower the viscosity of an adhesive having a viscosity at 350°F of about 13,625 cps to a viscosity of about 4,000–10,000 cps.

Other additives commonly used in hot melt adhesives and useful as optional ingredients in the adhesives of the present invention include stabilizers or antioxidants such as butylated hydroxytoluene (BHT), pigments such as clays and titanium dioxide, fire-retardants such as antimony oxide and aluminum oxide, and non-block additives such as stearamide.

The free radical initiator utilized in the graft copolymerization is selected on conventional grounds for the specific polymerization parameters involved. Benzoyl peroxide is preferred as it has a favorable rate of decomposition at the boiling point of vinyl acetate. Tertiary butyl perbenzoate is longer lasting than the benzoyl peroxide when the boiling point is allowed to rise during the course of polymerization. Azobisisobutyronitrile is useful in those instances where benzoyl peroxide is ineffective (for example, in the presence of N-vinyl pyrrolidone), and ammonium persulfate may be utilized in conjunction with an acid acceptor to prevent thermal instability of the resulting hot melt adhesive.

More specifically, the graft copolymers of the present invention are prepared by dissolving the water-soluble polyalkylene oxide polymer in the monomer (or monomer/comonomer), adding a free radical initiator, and performing a conventional free radical polymerization. In some instances additional refinements are advisable. For example, solvents may be utilized to enhance the mutual solubility of the polymer and the monomer, but solvents in general are undesirable since they must be removed at the end of the process and lower grafting efficiencies by competing with the water-soluble polymer in the chain transfer reaction. Where a very active monomer is being used, the polymer may be dissolved in a limited quantity of the monomer and additional quantities of the monomer slowly added during the course of polymerization. The use of chain transfer agents such as the mercaptans to reduce the molecular weight of the graft copolymer is not recommended as such chain-transfer agents lower the grafting efficiency by competing with the water-soluble polymer in the chain transfer reaction; a preferred method of reducing the molecular weight is either to use a lower molecular weight polyalkylene oxide or to dissolve the polymer in only a portion of the monomer and then to slowly add the remainder of the monomer to the mix as polymerization proceeds.

A typical method of preparing the graft polymer involves charging a 500 millimeter, four neck flask with 60 grams of polyalkylene oxide polymer having an average molecular weight of about 6,000 (available from Union Carbide under the trade name CARBOWAX 6000), 180 grams of vinyl acetate and 0.35 grams of benzoyl peroxide - 78 (benzoyl peroxide moistened with about 22% by weight of water). The flask is fitted with a stainless steel stirer, thermometer, condenser and nitrogen inlet tube. The mixture is heated to reflux (about 73°C) with a slow nitrogen purge. As the polymerization proceeds, the solution develops viscosity and the boiling point gradually rises. After about 3 hours the mixture reaches 101°C and is held at this temperature for an additional half hour. Thereafter 1.2 grams of 4-methyl-2,6-di-tertiary butyl phenol is added and the reaction terminated; the residual monomer (about 2.7% by weight of the original monomer) is removed by vacuum distillation. The remaining product has a viscosity of 16,000 cps at 350°F and is dispersible in water.

In the formation of the hot melt adhesive, the various additives such as antioxidants, plasticizers and tackifying agents are generally added at the end of polymerization, either in the polymerization vessel (prior or subsequent to removing residual monomer) or in a separate mixing vessel; in some instances, however, one or more ingredients may be added in the beginning of polymerization providing, of course, they do not detrimentally interfere with the polymerization. By way of example, plasticizer may be added in the beginning of polymerization and the antioxidants and tackifying resin added at the end thereof. In this procedure a 500 millimeter, four neck flask is charged with 108 grams of polyalkylene oxide polymer having an average molecular weight of about 6000 (available from Union Carbide under the trade name CARBOWAX 6000), 360 grams of vinyl acetate, 12 grams of a polyalkylene oxide polymer having an average molecular weight of about 600 (available from Union Carbide under the trade name CARBOWAX 600) as a plasticizer, and a mixture of free radical initiators formed of 0.23 grams of benzoyl peroxide -78 and 0.18 grams of t-butyl perbenzoate. The mixture is refluxed under nitrogen atmosphere for two hours, during which time the temperature increases from 74° to 110°C, and is held for an additional 1.5 hours between 110° and 124°C. A viscous polymer is formed and 5.9 grams of antioxidant (4-methyl-2,6-di-tertiary butyl phenol also called butylated hydroxy toluene or BHT) and 89 grams of a tackifying resin (a terpinated phenol resin available from Reichhold Chemical, Inc. under the trade name NIREZ 2040) are added. The residual monomer (0.07%) is removed by vacuum distillation, leaving a water-dispersible product having a viscosity of 8,500 cps at 350°F.

As earlier mentioned, the additives are generally combined with the graft copolymer at the end of polymerization. In such a procedure, approximately half of the total tackifying resin concentration is placed in a jacketed heavy duty mixing kettle equipped with rotors and heated to the melting point of the particular tackifying resin (usually between 125° and 175°C). When the resin is melted, stirring is initiated; the graft polymer and antioxidant or stabilizer are then added. Desired optional additives are thereafter mixed in after prolonged periods of time in order to avoid the formation of lumps. Mixing and heating are continued until a smooth, homogeneous mass is obtained, whereupon the remainder of the tackifying resin and the functional diluent are thoroughly and uniformly mixed therewith. The resultant hot melt adhesive composition drawn off the kettle may be used immediately in hot pots; alternatively for particular applications it may be molten-extruded or converted to cylinders, slugs or billets depending on the equipment which would be subsequently used to apply the hot melt; if desired it may be placed in cooling pans and held in bulk for later use.

A particularly important area for the utilization of the hot melt adhesives of the present invention is in binding books. The basic perfect binding technique comprises the steps of: (1) printing, cutting, folding and arranging the signatures; (2) cutting the signatures to remove the signature folds and to expose a fully squared backbone; (3) roughing the backbone so as to expose the fibers at the back edge and make them more receptive to the hot melt composition; (4) apply the hot melt composition by means of any conventional equipment employed in the perfect binding industry so as to provide a continuous film or coating over the entire back surface of the sheets; (5) apply a suitable cover (for example, paper backing, kraft, crash or full cover) to the molten hot melt coating; (6) allowing the adhesive to solidify, thereby forming the spine of the book; (7) trimming the perfect bound book to the proper size; and (8) optionally dying or painting the edges of the front and ends of the sheets. As an optional step in the procedure, a coating of an emulsion or latex adhesive, e.g. a polyvinyl acetate emulsion, may be applied to the roughed backbone resulting from step (3) and then dried in order to aid in the eventual binding operation.

The adhesive utilized in a perfect bound book must be highly flexible if it is to perform effectively and maintain the book intact during use thereof. Some of the hot melt adhesives of the present invention exhibit the desired flexibility and may be hot melt applied during the book binding operation as a 5–35 mil wet film at 150°–200°C with a preferred melt viscosity of 5,000–30,000 cps.

Another important area for utilization of the hot melt adhesives of the present invention is in labeling bottles that are typically referred to as "returnable" — for example, returnable beverage bottles. Normal hot melt adhesives having the desired molten tack and low viscosity for high speed bottle labeling are typically sticky masses at room temperature and do not disperse in the "soaker" equipment used at the factory to remove the old label from the returnable bottle. The adhesives of the present invention are capable of high speed hot melt adhesion and permit the labels to be removed at the factory by a brief soaking in hot water.

EXAMPLES

Exemplary of the efficacy of the hot melt adhesives of the present invention are the following examples in which all parts and percentages are by weight. Examples 1–12 illustrate preparation of the graft copolymer, and Examples 13–26 illustrate preparation of the hot melt adhesive compositions using such graft copolymers. Example 27–28 compare the adhesives of the present invention with conventional hot melt adhesives. Examples 29–32 illustrate additional adhesives The following test procedures were used in evaluating the graft copolymers and hot melt adhesive compositions:

VISCOSITY TEST

The molten viscosity of a hot melt adhesive at a given temperature (usually 300°F or 350°F) was measured in centipoises (cps) utilizing a Thermosel Viscometer as supplied by Brookfield Engineering of Stoughton, Mass.

LOW TEMPERATURE FLEXIBILITY TEST

The molten mass was cast, by means of a heated Bird applicator, onto a polytetrafluorethylene-coated steel sheet yielding a film having a dry film thickness of 20 mils. After cooling, the film specimen was stripped from the plate and cut into ½ × 2 inch test specimens. A representative specimen was then placed in a temperature controlled, carbon dioxide cooled cabinet for a period of 5 minutes whereupon it was immediately flexed at a 30° angle. Where the specimen did not crack as a result of this procedure, a second identical specimen was placed in the cabinet at a lower temperature and the flexing procedure repeated. The temperature at which the specimen eventually cracked was thus viewed as its cold crack or "low temperature flexibility" value. Thus, as the latter value is decreased, there is a corresponding increase in the flexibility and stability which can be expected upon exposing these films and the books bound therewith to low temperature conditions.

TENSILE STRENGTH TEST

The tensile strength of a hot melt adhesive is determined on films cast from the hot melts according to Test Method A of ASTM procedure D 882-61T utilizing an Instron Tensile Tester, the films having been prepared according to the method set forth in the above-described "Low Temperature Flexibility Test". This procedure also provides a measurement of % elongation, which is the percentage stretch of the hot melt film at the point of rupture in obtaining the ultimate tensile strength.

PEEL TEMPERATURE TEST

A bead of test adhesive approximately ⅛ inch in diameter is applied at 350°F with a glass rod onto 60 pound/ream kraft paper. A second sheet of the same paper is placed in direct alignment with the first sheet within 2 seconds and pressed thereto to form a kraft-to-kraft bond.

The bonded sheets are then cut perpendicular to the adhesive line into 1 inch wide strips. Duplicate bonded specimens are placed in an oven with one free end of the specimen attached to a fixed support, and a 100 gram load suspended from the other free end. The oven temperature is then increased in 10°F increments at 15 minute intervals. The temperature at which bond delamination occurred is specified as the peel temperature.

PAPER TO PAPER TEAR TEST

A kraft-to-kraft bond is formed using the test adhesive and sheets of kraft paper, as set forth in the first part of the above-described "Peel Temperature Test". After temperature conditioning to a specified temperature, the sheets are then manually pulled apart and checked to see if tearing occurred.

DISPERSIBILITY TEST

See Examples 27 and 28.

EXAMPLE I

A useful graft copolymer of poly (ethylene oxide) and vinyl acetate was prepared (using a single-charge method) by charging the following ingredients into a two liter flask:

|  | Weight (g) | Parts |
|---|---|---|
| CARBOWAX 4000 | 350.0 | 35.0 |
| Vinyl acetate | 650.0 | 65.0 |
| Benzoyl peroxide 78[a] | 0.42 | — |
| t-butyl perbenzoate | 0.60 | — |

[a]benzoyl peroxide moistened with about 22% water.

The flask was fitted with a stainless steel stirrer, thermometer, condenser, and nitrogen inlet tube. The mixture was heated to reflux (74°C) with a slow nitrogen purge. As the polymerization proceeded, the boiling point and viscosity of the mixture increased. After 2 hours the temperature was 112°C, at which point refluxing ceased. The product was then heated to 150°C and maintained at that temperature for 0.5 hours. 10.0 g (1.0 parts) of 4-methyl-2,6-di-tertiary butyl phenol was added and the residual monomer (1% of the original monomer quantity) was removed by vacuum distillation. The viscosity of the product was 2,560 cps. at 300°F.

EXAMPLES 2–10

The following graft polymers of Table I were prepared in essentially the same manner as Example 1, and tested for viscosity and dispersibility. In Example 2, ammonium persulfate was used as the initiator and in Example 7, α,α-azobisisobutyronitrile was used as the initiator; in all other cases the initiator was the same as in Example 1. All the products dispersed in warm water (about 80°C).

EXAMPLE 11

This example illustrates molecular weight control achieved by delayed addition of part of the vinyl acetate to the polyalkylene oxide. The remainder of the vinyl acetate was polymerized in the single-charge manner.

A 1 liter, four-neck flask was charged with 125 g of POLYGLYCOL E-9,000 (average molecular weight 9,000) and 0.19 g of t-butyl perbenzoate. The flask was equipped with a stirrer, thermometer, condenser, nitrogen inlet tube and dropping funnel containing 37.5 g of vinyl acetate. 6 ml of the vinyl acetate was added and the mixture was heated, with a slow nitrogen purge, to 115°C. The remainder of the vinyl acetate was added over a 40 minute period while the internal temperature was held at about 115°C. The mixture was heated and held at 130°–136°C for 30 minutes, then cooled to 100°C.

A mixture of 337.5 g of vinyl acetate, 0.12 g of benzoyl peroxide-78 and 0.38 g of t-butyl perbenzoate was added and polymerized in the same manner as in Example 1. The final product had a viscosity of 25,250 cps. at 350°F and dispersed in water.

EXAMPLE 12

This example illustrates the preparation of a graft polymer of poly (ethylene oxide) with poly (methyl acrylate). The delayed addition method was used to control molecular weight.

A 500 ml flask was charged with 125.0 g CARBOWAX 6000, 0.16 g of benzoyl peroxide -78 and 0.06 g of t-butyl perbenzoate. The flask was equipped with a stirrer, thermometer, condenser, nitrogen inlet tube and dropping funnel containing a mixture of 125.0 g of methyl acrylate and 0.16 g of benzoyl peroxide -78. 30% of the monomer was added and the mixture was heated, with a slight nitrogen purge, to reflux (89°C). The remainder of the monomer was added over a 30 minute period during which the boiling point rose to 104°C. The reaction mixture was heated for an additional two hours at 105° to 126°C, treated with 1.25 g of 4-methyl-2, 6-di-tertiary butyl phenol, and the residual monomer (2%) removed by vacuum distillation. The product had a viscosity of 2125 cps. at 350°F and dispersed in warm water.

TABLE I

| EXAMPLE NO. | POLYALKYLENE OXIDE NAME | % | POLYALKYLENE OXIDE NAME | % | COMONOMER % VA | COMONOMER NAME | COMONOMER % | PRODUCT VISCOSITY cps. | PRODUCT Temp.,°F |
|---|---|---|---|---|---|---|---|---|---|
| 2 | CARBOWAX 4000 | 35.0 | — | — | 58.5 | HEA | 6.5 | 3,375 | 300 |
| 3 | CARBOWAX 6000 | 35.0 | — | — | 65.0 | — | — | 9,440 | 300 |
| 4 | PEG 6000 | 22.5 | CARBOWAX 600* | 2.5 | 75.0 | — | — | 18,625 | 350 |
| 5 | UCON 75H-90,000 | 20.0 | CARBOWAX 6000 | 10.0 | 70.0 | — | — | 22,750 | 350 |
| 6 | PLURONIC F-68 | 50.0 | — | — | 50.0 | — | — | 1,312 | 350 |
| 7 | CARBOWAX 6000 | 25.0 | — | — | 67.5 | VP | 7.5 | 17,250 | 350 |
| 8 | METHOXY CARBOWAX 5000 | 35.0 | — | — | 65.0 | — | — | 2,950 | 350 |
| 9 | CARBOWAX 6000 | 25.0 | — | — | 72.7 | SVS | 2.3 | 25,500 | 350 |
| 10 | CARBOWAX 6000 | 25.0 | — | — | 75.0 | — | — | 16,000 | 350 |

HEA=2-hydroxyethyl acrylate
VP=N-vinyl pyrrolidone
SVS=sodium vinyl sulfonate
*=as diluent

EXAMPLES 13–22

Hot melt compositions were formulated using some of the graft copolymers of Examples 1–12 by adding a tackifying resin and any optional ingredients after polymerization was completed and the graft polymer formed. The mixture was stirred and heated until a smooth, uniform blend obtained, this blend constituting the finished hot melt adhesive composition, and being drawn off and tested. The formulations and test results are indicated in Table II.

Example 13 illustrates a hot melt adhesive particularly useful for case and carton sealing, permitting the used container paper stock to be recycled.

Example 14–15 illustrate hot melt adhesives particularly useful in binding books that can be recycled. Book binding requires an adhesive exhibiting a high degree of flexibility, and the flexibility effect of the particular tackifying resins utilized may be comprehended by comparison of the properties of the adhesives with the properties of the raw copolymer of Example 4 (the latter having the following properties viscosity: 18,625 cps at 350°F; elongation: 960%; cold crack temperature: 45°F). The adhesives exhibit a substantial improvement over the raw copolymer: a greatly reduced cold crack temperature and a 34–47% increase in percent elongation.

Example 16 illustrates a hot melt adhesive showing particular utility in sealing corrugated cases that can be

TABLE II

| EXAMPLE | 13 | 14 | 15 | 16 | 17 | 18 | 19 | 20 | 21 | 22 |
|---|---|---|---|---|---|---|---|---|---|---|
| COPOLYMER, parts | | | | | | | | | | |
| Example 1 | 80 | | | | | | | | | |
| 3 | | | | 75 | | | | | | 75 |
| 4 | | 85 | 85 | | | | | | | |
| 5 | | | | | 85 | 85 | 85 | | | |
| 11 | | | | | | | | 85 | | |
| 12 | | | | | | | | | 80 | |
| TACKIFYING RESIN, parts | | | | | | | | | | |
| A) Terpene Phenolic Resin | 20 | | | 25 | | | 15 | | | |
|   i) NIREZ 2040 | | | | | | | | 15 | | |
|   ii) PICCO PS 377 | | | | | | | | | | |
| B) Coumarone Indene Resin CUMAR R-16A softening point 94–107°C | | 15 | | | | | | | | |
| C) Gum Rosin | | | 15 | | | | | | 20 | |
| D) VINSOL Resin | | | | | 15 | | | | | |
| E) Phenolic modified Coumarone indene resin | | | | | | | | | | |
|   i) NEVILLAC special hard | | | | | | 15 | | | | |
|   ii) NEVILLAC, soft | | | | | | | | | | 25 |
| ADHESIVE PROPERTIES | | | | | | | | | | |
| Dispersible, test procedure ** | a | a | a | a | a | a | a | a | a | a |
| Viscosity 300°F,cps. | 2,500 | | | 5,000 | | | | | 1,500 | 1,500 |
| 350°F,cps. | | 15,000 | 8,125 | | 15,375 | 13,625 | 14,875 | 14,000 | | |
| Peel temperature,°F | 120 | | | 120 | | | | | | |
| Cold Crack Temperature, °F | | 15 | 5 | | | | | | | |
| Elongation, % | | 1,290 | 1,415 | | 1,585 | 1,540 | 1,815 | 1,665 | | |
| Ultimate Tensile Strength, psi | | | | | 480 | 565 | 735 | 700 | | |
| Paper tearing bonds,°F | −10 / −80 | | | 0* / −20* | | | | | | |

*Corrugated-to-corrugated bonds
**a— Tested by the procedure of Example 27.
  b— Tested by the procedure of Example 28.

recycled. One part of the butylated hydroxytoluene (BHT) antioxidant was included in the adhesive formulation.

Examples 17–19 illustrate hot melt adhesives of high tensile strength. The reinforcing effect of the tackifying resins may be appreciated by comparison of the properties of the adhesives with the properties of the raw copolymer of Example 5 (the latter having the following properties—ultimate tensile strength: 25 p.s.i.; elongation: 2,585%). The improvement of tensile strength is from 1900% to 2900%.

Example 20 illustrates a hot melt adhesive having an ultimate tensile strength more than 6 times that of the raw copolymer of Example 11 (the latter having the following properties —ultimate tensile strength: 110 p.s.i.; elongation: 1,750%).

Example 21 illustrates a hot melt adhesive particularly useful in connection with coated board stock which is typically resistant to adhesion.

Example 22 illustrates a hot melt adhesive which is particularly suitable for returnable bottles. A glass bottle was labeled using the hot melt adhesive of Example 22 by coating the label with hot melt at 300°F with a coating weight of 3 mils and immediately applying the label to the glass bottle. A paper tearing bond was obtained. The labeled bottle was subsequently tested by twirling in warm water at 140°F. for approximately 3 minutes, at which point the label floated off the bottle as the hot melt adhesive dispersed in the water.

EXAMPLES 23–26

Examples 23–26 illustrate the use of wax-like diluents to lower the viscosity of a hot melt adhesive of the present invention. The adhesive formulations and their viscosities are indicated in Table III, the point of reference being the adhesive formulation of Example 18 which demonstrated a viscosity of 13,625 cps at 350°F.

TABLE III

| EXAMPLE | 23 | 24 | 25 | 26 |
|---|---|---|---|---|
| ADHESIVE COMPOSITION | | | | |
| Example 18, parts | 100 | 100 | 100 | 100 |
| ALDOL 64 | 10 | — | — | — |
| CASTORWAX | — | 5 | — | — |
| GMS 600 | — | — | 15 | — |
| MYRJ 52 | — | — | — | 20 |
| VISCOSITY, cps 350°F | 5,625 | 10,750 | 4,250 | 4,250 |

EXAMPLE 27

This example illustrates a technique for testing dispersibility of an adhesive and compares the test results of a hot melt adhesive composition according to the present invention and a conventional hot melt adhesive composition.

A piece of hot melt adhesive according to the present invention weighing 0.25 gram was added to 100 cc of water at 180°–190°F. in a Waring Blender. Agitation was started and continued for 15 min. At the end of this period, the hot melt was completely dispersed producing a cloudy milklike suspension. When poured through a 60 mesh screen, no solid discrete particles could be found.

In contrast, a similar test was run using a 0.25 gram piece of typical commerical bookbinding hot melt adhesive based on an ethylene vinyl acetate copolymer. After the 15 min. agitation the conventional hot melt had broken into several irregular pieces, none of which was dispersed. The water phase remained clear and the 60 mesh screen retained the pieces of undispersed hot melt.

The same results were obtained in both instances when the water in the blender was at room temperature.

EXAMPLE 28

This example illustrates another technique for testing dispersibility of an adhesive by simulating the recycling of a paper-backed pocket book bound with the adhesive, the actual test involving production of a paper sheet from pulp, $TiO_2$, and the adhesive dispersed according to the procedure of Example 27. The ratio of adhesive to paper in a pocket book is about the greatest of all adhesively bound books, and obviously the ratio of adhesive to paper will be less in a telephone book or a magazine, or when fresh pulp is mixed with recycled paper. Test results are provided both for a hot melt adhesive according to the present invention and a conventional hot melt adhesive.

A sample pocket book was selected having a backbone of 13/16 × 8⅛ inches and a total weight of 338 grams. Assuming the typical 20 mil thick glue line, this means 0.1324 in.³ of adhesive are present in the book. As the adhesive density is approximately 17 gram per in.³, the 338 gram book is 0.68% adhesive by weight; i.e., the equivalent of a sheet of paper containing 0.68% adhesive. In the following test procedure the ratio of dispersed adhesive to pulp and $TiO_2$ produces the mathematical equivalent of a sheet of paper containing 1.24% adhesive by weight, almost twice that found in the sample pocket book.

A Noble & Wood Handsheet machine is given a charge consisting of 4.5 grams of pulp (bleached soft wood sulfite pulp beaten to 400 ml Canadian Standard Freeness), 0.5 grams of $TiO_2$ (10% dispersion), 0.062 grams of hot melt adhesive dispersed according to the procedure of Example 27, and soft water (pH of 7.6) to make up 10–11 liters. An 8 × 8 inches hand sheet is formed from the paper pulp mixture and dried at 190°F using a tetrafluoroethylene plate and a stainless steel wire screen. Clogging of the wire screen used in the paper making machine is noted, the stickiness of the sheet to the wire screen used for drying a noted, and the presence of discernible particles of adhesive in the finished sheet is noted.

A mixture containing a dispersed hot melt adhesive according to the present invention produced no clogging, stickiness, or discernible particles of adhesive. A mixture containing a commerical ethylene-vinyl acetate hot melt adhesive produced a sheet with obvious pieces of hot melt adhesive available therein, the sheet having stuck to the wire screen during the drying step.

EXAMPLES 29–32

Various hot melt adhesive compositions were prepared from some of the graft polymers of Table I in essentially the same manner as Example 1, and tested for various properties as indicated in Table IV. Example 29 illustrates the use of a plasticizer, the resultant adhesive composition being stabilized with a mixture of 1 part butylated hydroxy toluene (BHT) and 0.1 part of zinc dibutyl dithiocarbamate (the latter antioxidant being sold by R. T. Vanderbilt Co. under the trade name BUTYL ZIMATE). Examples 31 and 32 illustrate the use of various non heat hardening phenolic resins.

It is noted that the aforelisted tackifying resins, optional wax-like diluents and other optional ingredients are only representative and not exhaustive of those useful in the practice of the present invention. For example, the tackifying resin may also be a 100% non-heat hardening phenol formaldehyde resin (such as those sold by Rohm & Haas of Philadelphia, Pa. under the trade name AMPEROL ST-149 and those sold by the

TABLE IV

| EXAMPLE | 27 | 28* | 29 | 30** |
|---|---|---|---|---|
| COPOLYMER, parts | | | | |
| Example 4 | | 85 | 95 | |
| Example 5 | | | | 85 |
| Example 9 | 75 | | | |
| TACKIFYING RESIN, parts | | | | |
| A) Terpene Phenolic Resin | | | | |
| NIREZ 2040 | 15 | 15 | | |
| B) Thermoplastic Phenolic Resin | | | | |
| AMBEROL ST-149 | | | 5 | |
| BAKELITE CKR-2400 | | | | 15 |
| PLASTICIZER, parts | | | | |
| PYCAL 94 | | | 10 | |
| ADHESIVE PROPERTIES | | | | |
| Dispersible, test procedure*** | a,b | a | a | c |
| Viscosity, cps at 350°F | 6,000 | 11,000 | 15,500 | 36,500 |
| Cold Crack Temp., °F | 20 | 25 | 15 | |
| Elongation, % | 1,290 | 1,585 | 1,460 | 1,690 |
| Ultimate Tensile Strength, psi | | | | 710 |

*Compare Examples 14–15
**Compare Example 17
*** a-Example 27 procedure
b-Example 28 procedure
c-On stirring a ¼ × ¼ piece of 20 mil film in 200°F water for 30 min., adhesive dispersed into discrete particles.

Union Carbide Plastics Co., a division of the aforementioned Union Carbide Corporation of New York, N.Y., under the trade name BAKELITE PHENOLIC RESIN CKR-2400). Such resins are oil soluble and thermoplastic compared to the more common heat hardening or thermosetting phenolic resins. Similarly, the wax-like diluent may also be a fatty amide such as the monoethanolamide of hydroxy stearic acid (sold by Baker Castor Oil Company under the trade name PARICIN 220). Also, additional optional ingredients may be plasticizers such as dibutyl phthalate and polyoxyethylene aryl ether (sold by the aforementioned ICI America under such trade names as PYCAL 94).

Now that the preferred embodiments of the present invention have been described, modifications and improvements thereon will become readily apparent to those skilled in the art. Accordingly, the spirit and scope of the present invention is to be limited only by the appended claims, and not by the foregoing disclosure.

We claim:

1. A water-dispersible hot melt adhesive composition comprising
    A. 75–95 parts by weight of graft copolymer of
        i. about 40–80% by weight of vinyl monomer; and
        ii. about 20–60% by weight of water-soluble polyalkylene oxide polymer having a molecular weight of about 3,000–20,000 and a polymerized ethylene oxide content of at least 50% by weight; and
    B. 5–25 parts by weight of tackifying resin.

2. The composition of claim 1 wherein said vinyl monomer is selected from the group consisting of vinyl acetate, methyl acrylate, ethyl acrylate and mixtures thereof.

3. The composition of claim 2, wherein said vinyl monomer is vinyl acetate.

4. The composition of claim 1 wherein said vinyl monomer is an alkyl-substituted acrylate.

5. The composition of claim 1 wherein said polyalkylene oxide polymer is selected from the group consisting of homopolymers of ethylene oxide, random copolymers of ethylene and propylene oxides, block copolymers of ethylene and propylene oxides, and mixtures thereof.

6. The composition of claim 1 wherein said graft copolymer contains about 25–45% by weight of said polyalkylene oxide polymer.

7. The composition of claim 1 wherein said polyalkylene oxide polymer has a polymerized ethylene oxide content of at least 75% by weight.

8. The composition of claim 1 wherein said graft copolymer additionally contains up to 20% by weight of reacted ethylenically unsaturated comonomers.

9. The composition of claim 8 wherein said comonomers are selected from the group consisting of 2-hydroxyethyl acrylate, N-vinyl pyrrolidone, and the sodium salt of ethylene sulfonic acid.

10. The composition of claim 1 comprising 75–85 parts by weight of said graft copolymer and 15–25 parts by weight of said tackifying resin.

11. The composition of claim 1 wherein said vinyl monomer is selected from the group consisting of vinyl esters, styrene, and the alkyl esters of acrylic acid having 1–8 carbon atoms in the alkyl portion.

12. The composition of claim 1 wherein said tackifying resin is a thermoplastic resin.

13. The composition of claim 1 additionally containing up to 25 parts of a wax-like diluent.

14. The composition of claim 1 wherein said graft copolymer contains about 25–45% by weight of said polyalkylene oxide polymer and said polyalkylene oxide polymer has a polymerized ethylene oxide content of at least 75% by weight.

15. The composition of claim 14 wherein said vinyl monomer is selected from the group consisting of vinyl acetate, methyl acrylate, ethyl acrylate and mixtures thereof.

16. The composition of claim 14 wherein said graft copolymer additionally contains up to 20% by weight of reacted ethylenically unsaturated comonomers.

17. The composition of claim 14 wherein said tackifying resin is a thermoplastic resin.

* * * * *